United States Patent Office 2,732,334
Patented Jan. 24, 1956

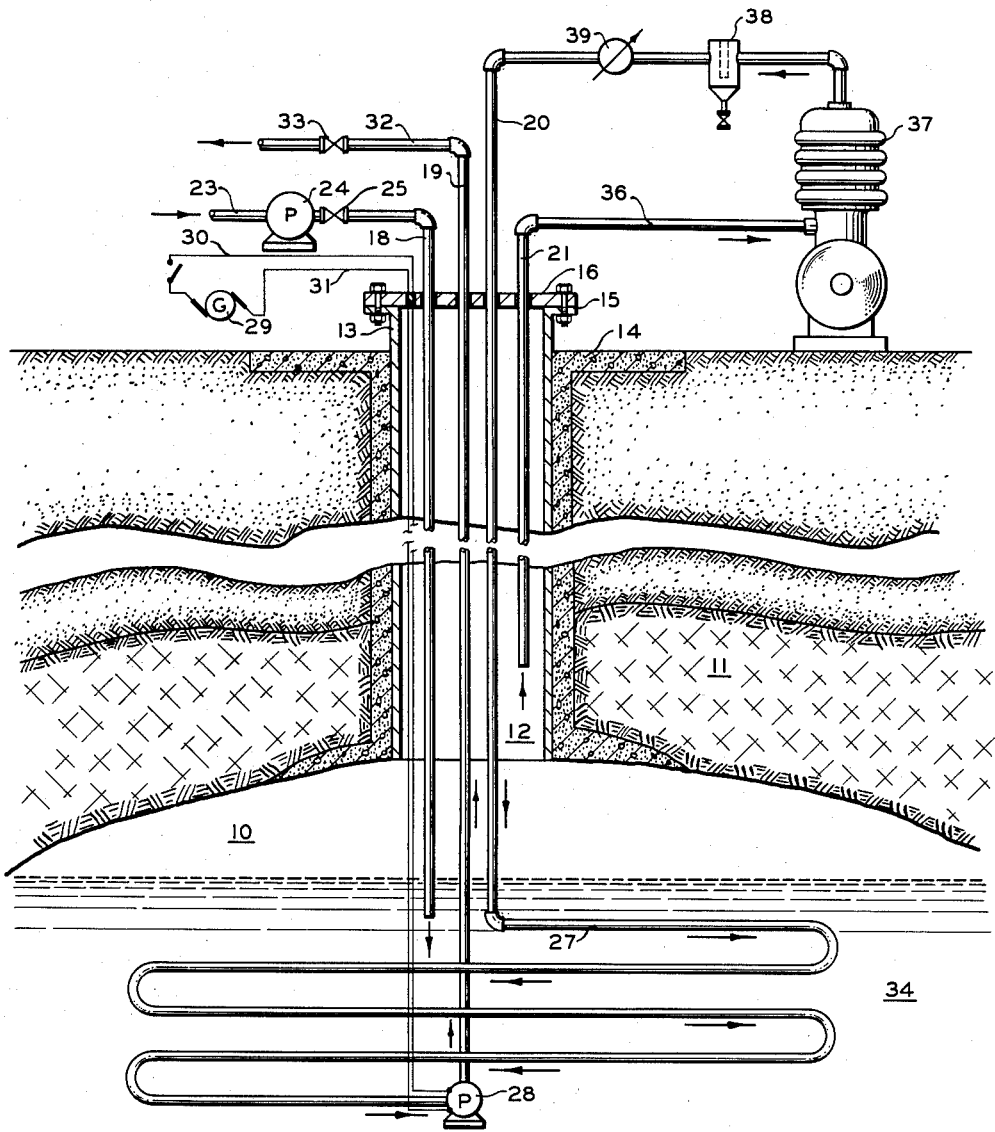

2,732,334

REMOVAL OF LIQUIDS FROM UNDERGROUND STORAGE FREE OF DISSOLVED IMPURITIES

Lyle W. Pollock, Bartlesville, Okla., assignor to Phillips Petroleum Company, a corporation of Delaware Application October 1, 1953, Serial No. 383,585

9 Claims. (Cl. 202—75)

This invention relates to underground storage of liquids. In one specific aspect it relates to the storage of liquid ammonia in underground salt caverns.

The economical storage of large quantities of liquids is a problem of long standing in the chemical and petroleum industries. This is particularly true with regard to the storage of chemicals for which there is a seasonal demand. In the field of liquefied petroleum gas, it recently has been proposed to store the liquefied gas in underground caverns such as leached salt formations or abandoned mines in impermeable shale or limestone. However, for the storage of other chemicals in such a manner, considerable difficulty often is encountered which makes such storage impractical or impossible. This difficulty can result from a tendency of the walls of the formation to be dissolved in the material being stored or from a chemical reaction between the formation walls and the material being stored. For example, if liquid ammonia is stored in salt caverns, several per cent by weight of salt becomes dissolved in the ammonia. This has at least two adverse effects on such a storage system: the first being that the walls themselves become dissolved, and the second being that it becomes necessary to purify the ammonia following its removal from the cavern. It is toward providing an underground liquid storage system that overcomes the above-mentioned difficulties that the present invention is primarily directed.

Accordingly, it is an object of this invention to provide a method of storing liquids in underground caverns, the walls of which are soluble to some extent in the liquids being stored.

Another object is to provide a method of removing liquids from an underground storage cavern in a manner such that the liquids are free from dissolved impurities.

A further object is to provide an improved method of removing pure liquids from underground storage cavities through a minimum expenditure of energy.

A further object is to provide a method of storing liquid ammonia successfully in underground salt caverns.

A still further object is to provide simplified apparatus for carrying out the above-mentioned objects.

This invention comprises, generally, forming an underground cavity to receive the liquid to be stored and positioning a heat exchange conduit therein. This cavity can be formed in an earth formation that is slightly soluble in the liquid being stored. If ammonia is to be stored, the cavity can be formed in a salt bed, for example. In order to remove the liquid, vapor is withdrawn from the region above the surface of the liquid. This vapor subsequently is compressed, circulated through the heat exchange conduit which is positioned beneath the surface of the liquid in the cavity, and finally removed from the cavity in liquid phase. The step of circulating the compressed vapor through the heat exchange conduit in the cavity serves to vaporize additional quantities of liquid for removal through the vapor line. By this procedure a liquid product is obtained that is free from dissolved impurities because the withdrawn liquid is removed initially as a vapor.

Other objects, advantages and features of this invention should become apparent from the following detailed description taken in conjunction with the accompanying drawing which is a schematic representation of apparatus suitable for use in carrying out this invention.

Referring to the drawing in detail there is shown a cavity 10 in an earth formation 11. For purposes of describing a preferred embodiment of this invention reference will be made to a particular system for storing liquid ammonia in a salt cavity. However, as discussed in greater detail hereinafter, the invention is not limited to this particular storage system. In this example, cavity 10 is located in a salt bed 11 which is positioned below the surface of the earth. Such a cavity can be mined in a conventional manner or can be formed by circulating water in the formation to dissolve salt from bed 11. A procedure of this latter type is described in greater detail in The Oil and Gas Journal, August 17, 1950, page 59. A shaft 12 having a casing 13 therein extends between cavity 10 and the surface of the earth. Shaft 13 can be sealed in position by a quantity of cement 14 as illustrated. The upper end of casing 13 terminates in a flange 15 to which is bolted a cover plate 16. A plurality of pipes 18, 19, 20 and 21 extend through suitable packing glands in plate 16 and terminate at their lower ends in or adjacent cavity 10.

The upper end of pipe 18 communicates with an inlet pipe 23 which has a pump 24 and a valve 25 therein. The lower end of pipe 18 extends into cavity 10. The liquid ammonia to be stored is passed into cavity 10 through pipe 18. A heat exchange conduit 27 is positioned within cavity 10 in any suitable manner. For example, if cavity 10 has been mined, the interior thereof is readily accessible through the mine shaft. If cavity 10 is formed by a solution method, then shaft 12 or an auxiliary shaft must be provided of sufficient diameter to enable the heat exchange conduit to be positioned in cavity 10. One end of conduit 27 communicates with the lower end of pipe 20 and the second end of conduit 27 communicates with the lower end of pipe 19. A pump 28, which can be electrically operated, is positioned in pipe 19. Pump 28 is connected to a source of electrical energy 29 at the surface by leads 30 and 31. The upper end of pipe 19 is connected to an outlet product line 32 having a valve 33 therein. The lower end of pipe 21 extends downwardly through shaft 12 such that the lower end of pipe 21 is above the surface of the liquid 34 which is stored in cavity 10. The upper end of pipe 21 is connected by a line 36 to the inlet of a compressor 37. The outlet of compressor 37 is connected through an oil trap 38 and a heat exchanger 39 to the upper end of pipe 20.

The liquid ammonia to be stored is passed into cavity 10 through line 23 and pipe 18. When it is desired to remove the liquid ammonia from cavity 10, vapor from above the surface of liquid 34 is passed upwardly through pipe 21 and line 36 to compressor 37. The vapor is therein compressed and passed as a vapor back into the cavity through pipe 20. This compressed vapor circulates through conduit 27 and ultimately is removed from the cavity through pipe 19 by means of pump 28. In passing through conduit 27, the vapor is condensed and thereby gives up a portion of its heat to the liquid 34 which facilitates further vaporization of this liquid. Heat exchanger 39 is provided to maintain the liquid ammonia at a generally constant temperature. This avoids any increased pressure in cavern 10 due to a temperature increase.

Although liquid ammonia dissolves approximately five per cent by weight of salt (sodium chloride) at normal room temperature, the above-described procedure functions to remove a liquid product stream that is salt-free. If liquid ammonia were removed directly from cavity 10 it would be necessary to purify the product at the surface.

This would require some type of evaporator, and disposal of the resulting salt would present an additional problem. Furthermore, such a direct liquid removal procedure would result in salt being continuously dissolved and removed from cavity 10 with each subsequent storage operation. This would enlarge the cavity. The removal system of the present invention, however, avoids these difficulties since salt-free vapor is removed initially from cavity 10.

An important feature of the ammonia storage and removal system of this invention resides in the fact that the solubility of salt in ammonia is an inverse function of temperature, that is, less salt is dissolved when the temperature of the liquid ammonia is elevated. Thus, the passage of the heated vapor through conduit 27 results in the temperature of liquid 34 being elevated whereby a portion of the dissolved salt settles out. This removed salt is in the form of small crystals which tend to become dissolved first when additional quantites of liquid ammonia are stored in cavity 10. Therefore, cavity 10 is not enlarged to any great extent by continuous operation of the storage method of this invention.

The following example is presented to illustrate the principles of operation of this invention. If the temperature in cavity 10 is approximately 90° F., the saturated vapor pressure of the ammonia is approximately 180 pounds per square inch absolute (p. s. i. a.) The vapor entering compressor 37 can be at a temperature of approximately 90° F. and at a pressure of approximately 170 p. s. i. a. The vapor passed into pipe 29 from compressor 37 can be at a temperature of 160° F. and a pressure of approximately 300 p. s. i. a. The liquid product finally removed through pipe 19 can be at a temperature of approximately 120° F. and a pressure of approximately 280 p. s. i. a. This example, however, is given merely by way of illustrating the operating principles of this system and is not intended as a limitation. The operating temperatures and pressures in any given installation can, of course, deviate to a large extent from these values. The operating conditions in any given installation are determined primarily from an economic consideration of such factors as the temperature of cavity 10, the efficiency of heat exchange between conduit 27 and liquid 34, and the cost of operating compressor 37.

Furthermore, the illustrated apparatus is merely a schematic representation of the basic apparatus required to carry out this storage method. If desired a plurality of heat exchange conduits 27 can be provided in cavity 10, and these conduits can be connected individually to pipes 19 and 20. Through an arrangement of this type, the compressed vapor can be circulated at all times through an individual conduit which is below the level of liquid 34 irrespective of the liquid level in cavity 10. Inlet pipe 18 can be connected directly to outlet pipe 21 if desired to eliminate one of the pipes passing through shaft 12. This arrangement is feasible in most installations since it generally is not desired to remove vapor at the same time liquid is being passed into the cavity.

While this invention has been described in conjunction with the storage of liquid ammonia in a salt cavity, the principles of the invention are not restricted thereto. This storage method can be employed whenever it is desired to store a liquid in an underground cavity which is of such composition that a portion of the cavity may become dissolved in the liquid being stored. Thus, while this invention has been described in conjunction with a present preferred embodiment thereof, it should readily be apparent that the invention is not limited thereto.

What is claimed is:

1. The method of storing liquids in an underground cavern which comprises passing liquid to be stored into an underground cavern formed in an earth formation which is soluble to some extent in the liquid being stored, subsequently removing vapor of said liquid from a region above the surface of the liquid within the cavern, compressing said vapor, passing said compressed vapor in heat exchange relationship with the liquid in the cavern thereby to condense said compressed vapor, and removing the compressed vapor as a liquid from the cavern.

2. The method of storing liquid ammonia in an underground cavern which comprises passing liquid ammonia to be stored into an underground cavern formed in a salt formation, subsequently removing ammonia vapor from a region above the surface of the liquid ammonia in the cavern, compressing said ammonia vapor, passing said compressed ammonia vapor in heat exchange relationship with the liquid ammonia in the cavern thereby to condense said compressed ammonia vapor, and removing the condensed vapor as liquid ammonia from the cavern.

3. The method of storing liquids which comprises forming a storage cavern in an earth formation which is somewhat soluble in the liquid being stored, passing liquid to be stored into the underground cavern, subsequently removing vapor of said liquid from a region above the surface of the liquid within the cavern, compressing said vapor, passing said compressed vapor in heat exchange relationship with the liquid in the cavern thereby to condense said compressed vapor, and removing the compressed vapor as a liquid from the cavern.

4. The method of storing liquid ammonia which comprises forming a storage cavern in an earth formation that is somewhat soluble in the liquid ammonia, passing liquid ammonia to be stored into the underground cavern, subsequently removing ammonia vapor from a region above the surface of the liquid ammonia in the cavern, compressing said ammonia vapor, passing said compressed ammonia vapor in heat exchange relationship with the liquid ammonia in the cavern thereby to condense said compressed ammonia vapor, and removing the condensed vapor as liquid ammonia from the cavern.

5. The method in accordance with claim 4 wherein said cavern is formed in a salt bed.

6. The method of removing substantially salt-free liquid ammonia from an underground cavity formed in a salt formation which comprises removing vapor from a region above the surface of the liquid ammonia in the cavern, compressing said vapor, passing said compressed vapor in heat exchange relationship with the liquid in the cavern thereby to condense said compressed vapor, and removing the compressed vapor as a liquid from the cavern.

7. Apparatus for use in storing liquids in and subsequently removing liquids from an underground storage cavern which comprises, in combination, a first inlet conduit extending between the surface of the earth and the underground storage cavern, a heat exchange conduit disposed within the cavern, a second conduit extending between one end of said heat exchange conduit and the surface of the earth, a third conduit extending between the second end of said heat exchange conduit and the surface of the earth, a fourth conduit extending between the surface of the earth and a region adjacent the top of the underground cavern, a compressor, means connecting the inlet of said compressor to the upper end of said fourth conduit, and means connecting the outlet of said compressor to the upper end of said third conduit.

8. The combination in accordance with claim 7 further comprising a pump to force liquid from said heat exchange conduit through said second conduit.

9. The combination in accordance with claim 7 further comprising a heat exchanger disposed between the outlet of said compressor and said third conduit.

References Cited in the file of this patent

UNITED STATES PATENTS

| | | |
|---|---|---|
| 1,529,233 | Barbet | Mar. 10, 1925 |
| 1,923,896 | Trump | Aug. 22, 1933 |
| 2,185,596 | Kleinschmidt | Jan. 2, 1940 |
| 2,590,066 | Pattinson | Mar. 18, 1952 |
| 2,675,296 | Gollmar | Apr. 13, 1954 |